United States Patent [19]

Fletcher

[11] Patent Number: 4,625,096

[45] Date of Patent: Nov. 25, 1986

[54] LIQUID BATH TEMPERATURE CONTROL

[75] Inventor: Taylor C. Fletcher, Fullerton, Calif.

[73] Assignee: American Hospital Supply Corporation, Evanston, Ill.

[21] Appl. No.: 656,756

[22] Filed: Oct. 1, 1984

[51] Int. Cl.$^4$ .......................... H05B 1/02; F24H 1/10; G01N 35/02

[52] U.S. Cl. .................................... 219/331; 219/296; 219/306; 219/308; 422/65

[58] Field of Search ............... 219/331, 328, 308, 306, 219/296–299; 422/64–67; 165/30; 374/3

[56] References Cited

U.S. PATENT DOCUMENTS

| | | | |
|---|---|---|---|
| 1,673,567 | 6/1928 | Hynes | 219/303 X |
| 2,876,327 | 3/1959 | Leisey | 219/331 X |
| 3,074,410 | 1/1963 | Foster | 219/331 X |
| 3,227,207 | 1/1966 | Litman | 219/331 X |
| 3,291,200 | 12/1966 | Lutz | 165/30 X |
| 3,315,892 | 4/1967 | Haake | 219/331 X |
| 3,370,454 | 2/1968 | Flores | 219/331 X |
| 3,760,147 | 9/1973 | Tyrey | 219/330 X |
| 4,167,663 | 9/1979 | Granzow et al. | 219/330 X |
| 4,313,735 | 2/1982 | Yamashita et al. | 422/67 X |
| 4,358,667 | 11/1982 | Johnson et al. | 219/331 |
| 4,528,159 | 7/1985 | Liston | 422/65 |

*Primary Examiner*—A. Bartis
*Attorney, Agent, or Firm*—Perman & Green

[57] ABSTRACT

The temperature of a liquid bath in the tank of a clinical analyzer is precisely regulated to a known reaction temperature, for example, 37.0 degrees C., notwithstanding the transport of cuvettes through the tank by a conveyor for photometric analysis, by providing an electric heater assembly externally of the tank in a circulation loop through which the both liquid is circulated from a tank liquid outlet to a tank liquid inlet. The temperature of the liquid is measured by a first temperature sensor located downstream of the heater assembly but upstream of the tank inlet and a second temperature sensor located in the tank remote from the tank inlet. The deviation of the measured liquid inlet temperature from a preset liquid inlet temperature and the deviation of the measured tank temperature from the desired constant tank temperature are used to obtain a heating element drive signal for controlling the energization of the heater assembly to maintain the bath temperature constant. The temperature sensors comprise thermistor probes, with the time constant of the second temperature sensor being about ten times that of the first temperature sensor.

31 Claims, 10 Drawing Figures

110
124
128 SAFETY THERMOSTAT
122
126
108
120
118
116 ELEC. HEATING COIL
130
112
134
114
144
140
146
142

LIQUID BATH TEMPERATURE CONTROL

BACKGROUND OF THE INVENTION

The present invention relates generally to the control of liquid temperature in a liquid bath so that the temperature is uniform throughout the bath, and more particularly, to a method of and a system for controlling the heating of the bath liquid so that a desired constant liquid temperature is maintained throughout the bath notwithstanding the transport of objects to be heated by the bath through the bath liquid, or other causes of sudden changes in the ambient temperature conditions.

Liquid bath temperature control for maintaining a desired bath liquid temperature while containers of liquid samples to be heated are transported through the bath are typically embodied in automated clinical analysis systems such as disclosed in U.S. patent application Ser. No. 575,924, filed Feb. 1, 1984, and assigned to the assignee of the present invention. The contents of Ser. No. 575,924 application are incorporated in their entirety by reference in the present application.

In clinical analysis systems such as the one disclosed in Ser. No. 575,924 application, a series of cuvettes are transported in the form of a belt through a heated water bath so that, when a patient sample and a reagent are mixed in each cuvette prior to photometric analysis, the reaction mixture will be at a predetermined incubation temperature on which computations carried out by the analyzer are based.

It will therefore be understood that if the actual reaction mixture temperatures in the cuvettes are not at the assumed level of temperature; for example, 37.0 degrees Centigrade (C.), the analyzer data will be subject to error. In fact, the analyzer data can be affected as much as 8% per degree C., for such changes in sample temperature.

The prior bath temperature control arrangement basically included a heating element for heating water entering a bath tank through which the cuvette belt was transported. The water influent entered the tank through a fitting passing through the bath tank bottom plate, the fitting having a hose connected to it which laid in the bath parallel to the bottom plate. The downstream opening of the hose was directed over a water temperature sensor within the bath tank, the sensor having an unspecified time constant.

Temperature control for the bath water was carried out by turning the heating element on until the desired temperature was detected by the sensor next to the inlet hose opening. The prior temperature control could not, however, always assure that the bath water temperature was uniformly regulated to within plus or minus 0.1 degrees C. of the desired 37 degrees C. incubation temperature for the sample and reagent mixture during photometric analysis. Even after an "air sensor" was connected in series with the water sensor, calibration of the air sensor was difficult, and the overall system still would not hold the bath water temperature constant during changes in ambient temperature level. Further, a relatively long time period was required for the bath temperature to return to the desired level after parts of the analyzer in the region of the bath were removed and replaced during maintenance.

SUMMARY OF THE INVENTION

The present invention overcomes the above and other shortcomings in the prior liquid bath temperature controllers. It provides for the control of bath water temperatue in a clinical analyzer to within tolerable limits notwithstanding changes in the ambient temperature level and notwithstanding the continuous transport of cuvettes containing liquid samples and reagent mixtures through the water bath for photometric analysis.

The invention also provides control for the accurate regulation of bath water temperature in clinical analyzers, such control being implemented with little if any alteration in the existing analyzers. The invention provides a liquid bath temperature control which uses dual control loops to provide precise temperature control under all conditions and to achieve fast response without over-shoot or oscillation about the desired regulated temperature.

In accordance with the present invention, a method of controlling the temperature of a liquid bath in a tank so that a desired constant liquid temperature is maintained substantially throughout the liquid bath, includes providing a heating element in heat transfer relation with liquid entering the tank at liquid inlet means, measuring the temperature of the liquid proximate to the heating element, measuring the temperature of the liquid at a point in the tank remote from the liquid inlet means, and energizing the heating element according to the measured temperatures obtained in the two measuring steps.

Further, according to the invention, a system for controlling the temperature of a liquid bath to obtain a desired constant liquid temperature throughout the bath, includes means for heating the liquid entering a bath tank at liquid inlet means, first sensor means proximate to the heating means for detecting the temperature of the liquid entering the tank, second sensor means for detecting the temperature of the liquid in the tank at a point remote from the liquid inlet means, and bath temperature control means coupled to the first and the second sensor means for energizing the heating means according to the liquid temperatures detected by the first and the second sensor means.

For a better understanding of the present invention, reference is made to the following description and accompanying figures, while the scope of the present invention will be pointed out in the appended claims.

DETAILED DESCRIPTION

Figure 1:
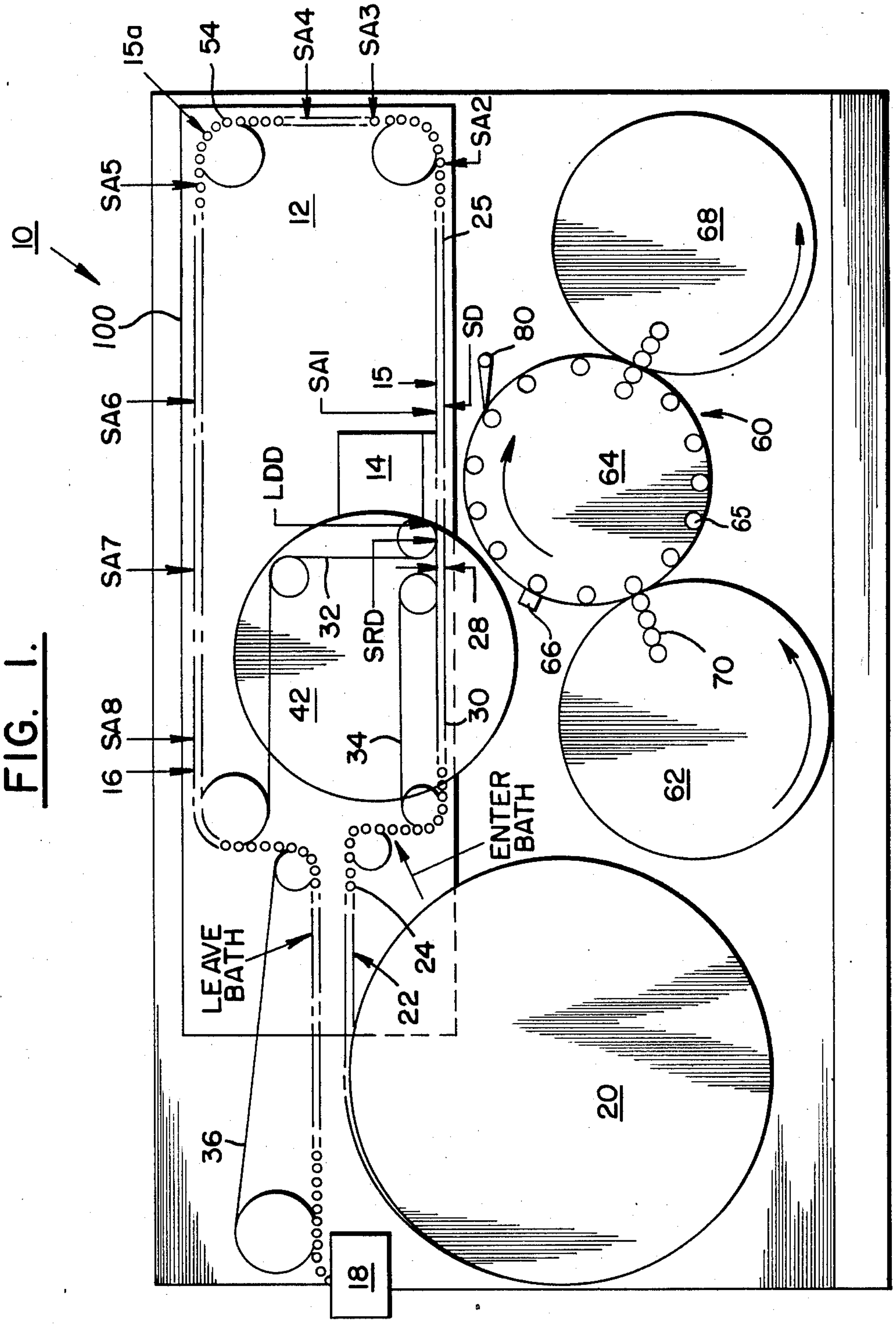
FIG. 1 is a schematic plan view of an automated clinical analyzer in which the bath temperature control of the present invention may be embodied.

FIG. 1 illustrates an automated clinical analyzer 10 generally as described in the above-mentioned U.S. patent application Ser. No. 575,924. Specifically, the analyzer 10 corresponds to one manufactured by American Hospital Supply Corporation and known as the Paramax Analytical System. The analyzer 10 is adapted for the testing of constituents in biological fluids, such as blood samples.

The analyzer 10 includes a series of processing stations past which strips of disposable reaction cuvettes 24 are indexed or advanced. The cuvettes 24 are supplied from a supply reel 20 in the form of a continuous cuvette belt 22, and are indexed through the analyzer 10 by a tractor conveyor 30 which engages a row of indexed holes (not shown) in the cuvette belt 22.

The cuvettes 24 are indexed in turn past the following stations; namely, a belt cutter 28 for dividing the cuvette belt 22 into sections, a tabletted reagent dispenser carousel 42 which comprises a circular array of reagent tablet dispensers (not shown) which are rotated by bringing the correct solid reagent to point SRD where a reagent tablet is dropped into a cuvette 24, a diluent and liquid reagent dispenser (not shown) adjacent the carousel 42 for adding sufficient diluent for reagent tablet dissolution and/or for dispensing a liquid reagent into the cuvette 24 at point LDD, an ultrasonic mixing horn 14, a sample dispenser 80 for dispensing biological samples delivered by a transfer carousel 64 at point SD, an air-jet mixing apparatus at 15 for mixing the sample with the reagent and diluent in the cuvettes 24, eight photometric read stations at points SA1–SA8, the station SA1 following the ultrasonic horn 14 being arranged to verify proper reagent dispensing and dissolution, a further reagent dispenser at 54, a further air-jet mixing apparatus at **15*a* for mixing the sample and the further reagent, a cuvette sealer 16 and a cuvette collection station 18**.

During their passage through the analyzer, the cuvettes 24 are carried in a water bath 12 contained in a tank portion of the analyzer 10 so that the cuvettes and their contents are maintained at a constant temperature. The ulrasonic mixing horn 14 is immersed in the water bath 12 and, during operation, causes only insubstantial local heating so as not to affect the bath temperature. A photometer (not shown), which carries out the photometric analysis based on data obtained from the read stations at points SA1–SA8, is temperature stabilized with a water jacket that is fed by liquid effluent from the water bath 12, it being necessary that the photometer be maintained at a stabilized temperature for proper operation.

Other components of the analyzer 10 shown in FIG. 1 include a sample loading carousel 62 into which patient samples 70 are randomly loaded, and an unloading carousel 68 which receives the patient samples 70 after testing and stores them for future retrieval, if necessary. The loading carousel 62, unloading carousel 68 and the above-mentioned transfer carousel 64 together form a sample loading and transfer carousel assembly 60. The transfer carousel 64 has patient sample receiving slots 65 in which patient samples 70 are indexed around to a bar-code reader 66 which identifies the patient sample.

Also shown in FIG. 1 are a main transport belt 32 which drives the cuvettes 24 through the water bath 12, an unloading belt 36 which removes the tested cuvettes from the water bath 12 and automatically discards them at collection station 18, and a short loading belt 34 which threads the cuvette belt 22 into engagement with the main tractor belt 32. The conveyor 30 advances or indexes the cuvettes 24 through the analyzer 10 in steps corresponding to the spacing between cuvettes (the pitch of the belt 22) with the cuvettes 24 being stopped and held stationary for a dwell period between each advance. Each step may correspond to a suitable time interval of five seconds with a four-second dwell time between each indexing advance of the cuvettes 24.

Figure 2:
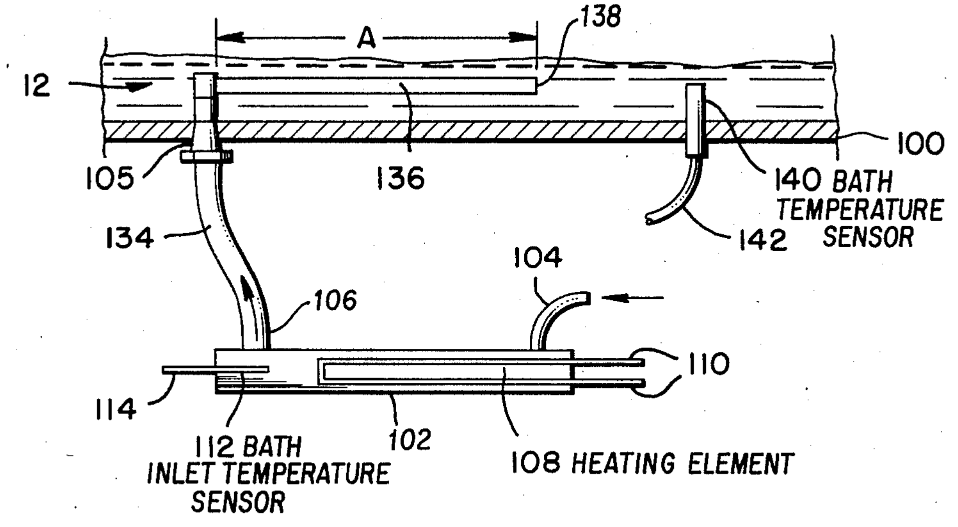
FIG. 2 is a cross-sectional view of a water bath in the analyzer of FIG. 1, showing a bath tank portion arranged with an inlet water heater assembly including an inlet water temperature sensor according to the invention.
Figure 3:
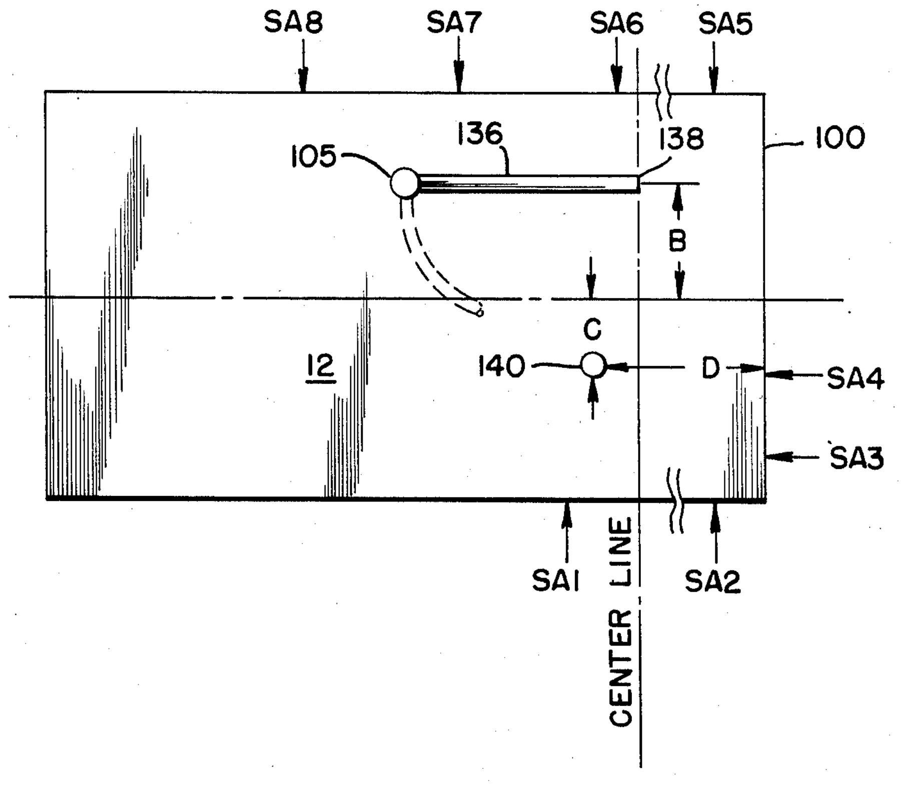
FIG. 3 is a top view of the bath tank portion in FIG. 2.

FIGS. 2 and 3 show a tank portion 100 of the analyzer 10 in FIG. 1, the tank portion 100 being formed and arranged in the analyzer 10 so as to contain the water bath 12 and mixing horn 14 (not shown in FIGS. 2 and 3), and to allow the transport of the cuvettes 22 about the perimeter of the tank portion 100 past the eight photometric read stations (SA1–SA8).

A bath water inlet heater assembly 102 is provided outside the tank portion 100 for heating bath water which is circulated into the tank portion 100 through an inlet fitting 105. Heater assembly 102 is also shown in the diagram of the plumbing system (FIG. 4) provided in the analyzer 10 for circulating the bath water effluent back to the inlet fitting 105 of the tank portion 100.

The heater assembly 102 basically is in the form of an elongate cylinder comprising a stainless steel pipe having a water inlet 104 for receiving a supply of the bath water, and a water outlet 106 for communicating heated bath water to the inlet fitting 105 of the bath tank portion 100. An elongate electric heating element 108 extends axially within the heater assembly 102 from the end of the assembly 102 closer to the water inlet 104, toward the end of the assembly 102 closer to the water outlet 106. A pair of wire leads 110 extend in water tight sealing relation from the inlet water end of the heater assembly 102 for connection of the output of bath temperature control circuitry described below in connection with FIGS. 7 and 8.

An elongate bath water inlet temperature sensor 112 extends axially within the heater assembly 102 from the water outlet end of the assembly 102 and in temperature sensing relation with the water exiting the heater assembly 102 at the outlet 106. The water inlet temperature sensor 112 is shown in detail in FIG. 6A, and has wire leads 114 extending in water tight sealing relation from the water outlet end of the heater assembly 102, for connection to the temperature control circuitry described below.

Figures 5, 6A, 6B:
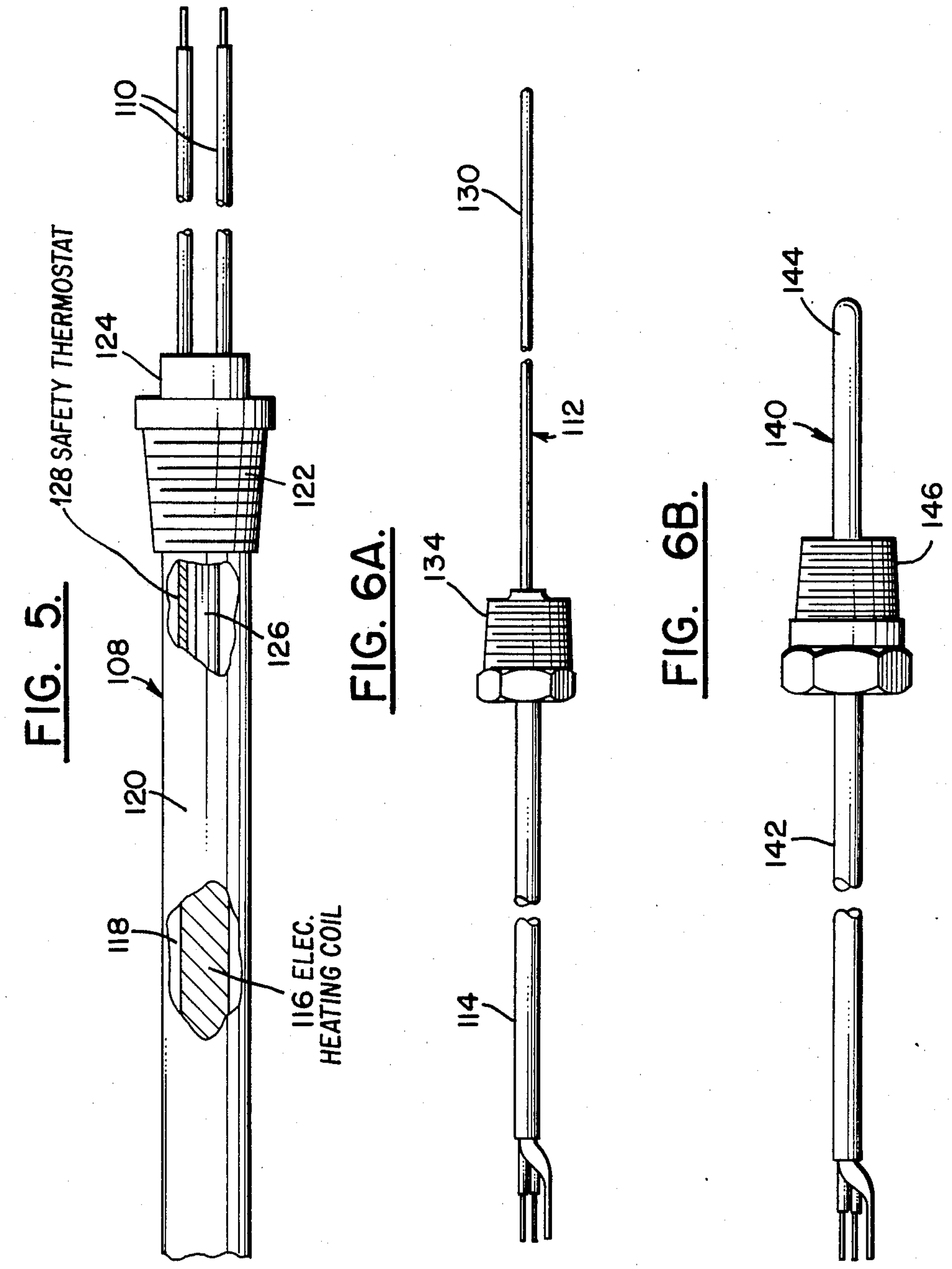
FIG. 5 is an enlarged partly sectional view of a heating element which forms part of the inlet water heater assembly shown in FIGS. 2 and 4.
FIG. 6A is an enlarged side view of an inlet temperature sensor which forms a part of the heater assembly in FIG. 2.
FIG. 6B is an enlarged side view of a temperature sensor for detecting the bath temperature at a point in the tank portion remote from the bath water inlet, as shown in FIG. 2.

The heating element 108, shown in detail in FIG. 5, is obtainable from Watlow Electric Manufacturing Co., St. Louis, Mo., under the name "Fire Rod", #J7JX 129A. The element is rated at 650 watts for 120 volt operation. An overall length for the heating element 108, excluding the wire leads 110, of about 7.5 inches (19.05 centimeters) has been found to allow for satisfactory results in the operation of the bath temperature control of the present invention. Of the overall length, about 5 inches (12.70 centimeters) is heated by an internal winding core 116. A high "K" fill 118 surrounds the winding core 116 and extends radially outward against the inner circumference of a stainless steel sheath 120. A satisfactory outside diameter of the sheath 120 has been found to be about 0.496 inches (12.60 millimeters). The wire leads 110 enter the base end of the heating element 108 through a stainless steel pipe fitting 122, which is provided with a Teflon seal 124.

One of the wire leads 110 connects internally to a copper electrode 126 which extends within the heating element sheath 120 to connect with the winding core 116. The remaining one of the leads 110 connects to one end of a thermostat 128 the other end of which is connected to the winding core 116. The thermostat 128 acts as an internal over-temperature switch in the event of accidental "dry" operation.

The water inlet temperature sensor 112 in the heater assembly 102 is shown in detail in FIG. 6A. The inlet temperature sensor 112 is a thermistor probe in the form of a stainless steel hypodermic needle 130. A satisfactory length for the probe portion of the sensor 112 has been found to be about four inches (10.16 centimeter), with an outside diameter of 0.036 inches (0.91 millimeter). The probe needle wall thickness is about 0.00625 inches (0.159 millimeter). The wire lead pair 114 is shielded and extends from the base end of the probe needle through a stainless steel pipe fitting 134 within which the connections between the lead pair 114 and a thermistor (not shown) within the probe needle 130 are secured with epoxy resin.

Satisfactory results have been obtained with the following electrical characteristics for the inlet temperature sensor 112:

Ro at 25 degrees C.=100K ohms

Ro ratio 0/50 degrees C.=9.1

Time constant=0.2 seconds max. in water at 20 ft/sec.

It has been found to be important, with respect to the desired operation of the present invention, that the bath water inlet temperature sensor 112 have a relatively short time constant such as the one noted above. As shown in FIG. 2, the water outlet 106 of the heater assembly 102 is connected to the inlet fitting 105 of the tank portion 110 of the analyzer 10, by a pipe or hose 134 of about 18 inches (45.7 centimeter) length and about 0.5 inches (1.27 centimeter) diameter. Pipe 134 is formed of Tygon material to provide sufficient thermal insulation for the heated water entering the bath 12 at the inlet fitting 105.

On the bath side of the inlet fitting 105, a straight pipe or hose 136 of Tygon material is coupled at one end to the inlet fitting 105 and extends generally parallel to the bottom wall and the longitudinal axis of the tank portion, as shown in FIGS. 2 and 3. Hose 136 is of a length A of about 6 inches (15.2 centimeter), and diameter of about 0.5 inches (1.27 centimeter). Also, the hose 136 is spaced a distance B of about 3 inches (7.6 centimeter) from the longitudinal axis of the tank portion 100, as shown in FIG. 3. The end 138 of hose 136 which opens within the water bath 12 lies approximately on the median line dividing the left-hand and right-hand sides of the tank portion 100 as viewed in FIGS. 2 and 3.

A bath temperature sensor 140 is located in the water bath 12 at a point in the tank portion 100 remote from the open end 138 of the hose 136 and the inlet fitting 105, as represented in FIGS. 2 and 3. The bath temperature sensor 140 also has a shielded wire lead pair 142 extending from its base end beneath the tank portion 100 for connection to the temperature control circuitry described below. A satisfactory location for the bath temperature sensor 140 has been found to be at a distance C from the longitudinal axis of the tank portion 100 of about 0.75 inches (1.9 centimeters), and a distance D of about 5.5 inches (14 centimeters) from the end wall of the tank portion 100 further from the inlet fitting 105.

Bath temperature sensor 140 is shown in detail in FIG. 6B and, similar to the water inlet temperature sensor 112 in the heater assembly 102, is a thermistor probe and in the form of a stainless steel tube 144. The tube 144 is of a length of about 1.25 inches (3.18 centimeters) and diameter of about 0.125 inches (3.18 millimeters). The shielded lead pair 142 connects with thermistor leads (not shown) within a stainless steel pipe fitting 146 and the connections are secured with epoxy resin. The electrical parameters of the bath temperature sensor 140 are the same as those for the water inlet temperature sensor 112 except that the time constant for the bath temperature sensor 140 is about 2.0 seconds in water at 20 ft./sec. which, in the present embodiment, is about ten times greater than the time constant for the water inlet temperature sensor 112.

Figure 4:
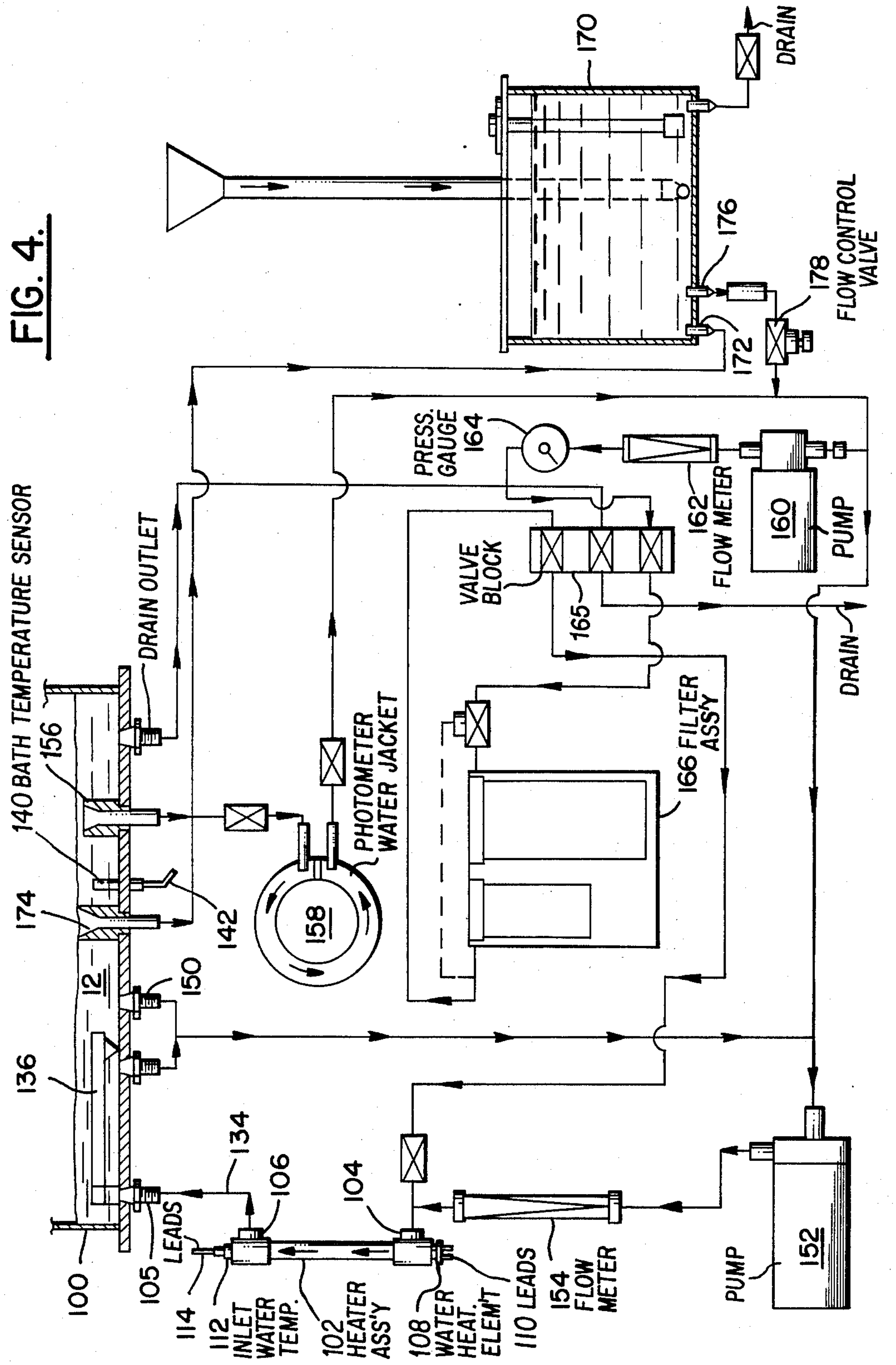
FIG. 4 is a schematic diagram of a plumbing system used for circulating bath water into and out of the tank portion of the analyzer in FIGS. 1-3.

The plumbing system in the analyzer 10, which circulates effluent from the water bath 12 back to the inlet fitting 105 of the tank portion 100, is shown in detail in FIG. 4. The heater assembly 102 which includes the water inlet temperature 112 and the heating element 108 appear beneath the left-hand side of the tank portion 100 as viewed in FIG. 4.

Basically, the plumbing system includes a high volume circulation loop for pumping bath water effluent from tank outlet fittings 150 through the heater assembly 102 and back into the tank portion 100 through the inlet fitting 105. A circulation pump 152 is provided in the high volume loop in series with a flow meter 154 for measuring the recirculation flow over a range of; for example, 0.5–5.0 gallons per minute. In the present embodiment, a flow rate of about 4 gallons per minute in the high volume loop has been found to provide satisfactory results.

A second or low flow circulation loop is also provided for recirculating overflow from the water bath 12 as the level of the water bath 12 rises above an evaporation adjustment outlet 156 extending up through the bottom wall of the tank portion 100. Bath effluent from the outlet 156 is directed through a photometer water jacket 158 which serves to maintain the photometer (not shown) of the analyzer 10 at a stable temperature, inasmuch as the bath water effluent from the outlet 156 is temperature regulated by way of the bath temperature control system of the analyzer. Water exiting the photometer water jacket 158 is then pumped by a replenishment pump 160 through a flow meter 162 (range, 0.1–1.0 GPM), a pressure gauge 164, and through a valve block 165 to a bath water filter assembly 166. Filtered water leaving the filter assembly 166 is directed back through the valve block 165, to the water inlet 104 of the heater assembly 102, to mix with the bath water effluent which leaves the tank outlets 150 and is recirculated by the pump 152 prior to heater within the heating assembly 102. The flow rate in the low flow loop is constant even if the pressure drop through the filter varies as it is driven by a positive displacement replenishment pump 160. The mix of filtered water entering the water inlet 104 on the heater assembly 102, and the unfiltered bath water recirculated by the pump 152 and entering the heater water inlet 104, is about 12.5% and 87.5%, respectively.

A system reservoir 170 is provided to maintain a supply of make-up water to replace bath water lost by evaporation. A bottom water inlet 172 on the reservoir 170 is supplied with bath water effluent from a high level system overflow outlet 174 which extends through the bottom wall of tank portion 100, and water leaves the reservoir 170 through a bottom outlet 176, passes through a flow control valve 178, and enters the low flow loop upstream from the photometer water jacket 158.

A drain outlet is provided through the bottom wall of tank portion 100, to allow all the tank water to be drained upon opening a corresponding valve of the valve block 165.

Figure 7:
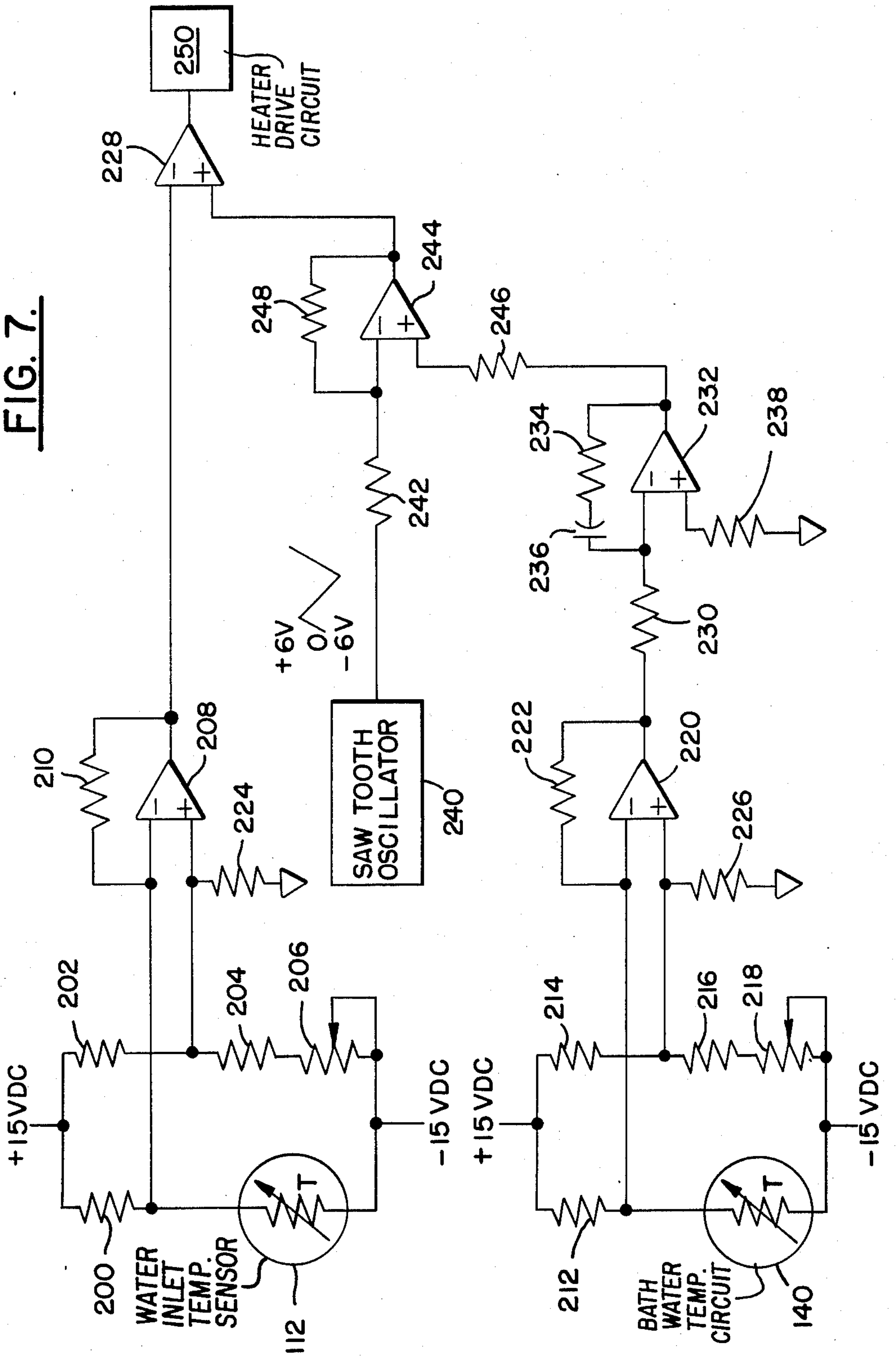
FIG. 7 is an electrical schematic diagram showing an embodiment of the present temperature control system for energizing the heating element, in accordance with the water temperatures detected by the temperature sensors.

FIG. 7 is an electrical schematic representation of a temperature control system for regulating the temperature of the water bath 12 in the analyzer 10, according to the invention. The water inlet temperature sensor 112 is connected to form one arm of a Wheatstone resistance bridge arrangement composed of resistors 200, 202, 204 and 206, as shown in the upper left-hand portion of FIG. 7. A DC balanced potential is applied across input terminals of the bridge, and output terminals of the bridge are connected to the positive and negative terminals of a DC differential amplifier 208. Amplifier 208 may be, for example, device type LF347N manufactured by National Semiconductor Corporation.

A feedback resistor 210 is connected between the output terminal of amplifier 208, and the negative input terminal of the amplifier to which an electrode of the inlet temperature sensor 112 is also connected. As shown at the lower left-hand portion of FIG. 7, the bath temperature sensor 140 forms part of a Wheatstone bridge resistor arrangement composed of resistors 212, 214, 216 and 218. The bath temperature sensor bridge arrangement also is energized by a balanced DC supply, and has output terminals connected to the negative and the positive input terminals of a DC differential amplifier 220. Amplifier 220 may be device type AD 517, manufactured by Analog Devices. A feedback resistor 222 is connected between the output terminal of amplifier 220, and the negative input terminal of the amplifier to which is also connected an electrode of the bath temperature sensor 140.

Input resistors 224, 226 are connected between the positive input terminals of amplifiers 208, 220, respectively, and ground.

It will be understood that the output of amplifier 208 corresponds to the degree of imbalance at the output terminals of the water inlet temperature sensor bridge arrangement, and that the output of amplifier 220 corresponds to the degree of imbalance at the output terminals of the bath temperature sensor bridge arrangement. In the present embodiment, the bridge resistors 206 and 218 are trimming resisters so that the corresponding resistor bridge arrangements for the water inlet and the bath temperature sensors 112, 140, produce a zero volt DC signal level at their associated output terminals when the temperatures detected by the sensors 112, 140 correspond to the desired water bath temperature; for example, 37.00 degrees C.

The output of the DC amplifier 208 is coupled to the negative input terminal of a DC comparator 228. Comparator 228 may be, for example, device type LF347N, manufactured by National Semiconductor Corporation.

The output of the DC amplifier 220, which output represents the deviation of the temperature detected by the bath sensor 140 from the desired regulated temperature; for example, 37.00 degrees C., is coupled through a resistor 230 to the negative input terminal of a DC integrator composed of an operational amplifier 232 and a series feedback circuit comprising resistor 234 and capacitor 236 connected between the output of amplifier 232 and the negative input terminal of the amplifier. The positive input terminal of amplifier 232 is connected to ground through resistor 238.

A triangular or saw tooth wave oscillator 240, the purpose of which is to enable the heating element 108 of the heater assembly 102 to be pulse-width modulated or energized, is arranged to provide a balanced triangular output waveform having amplitude limits of, for example, +6.0 volts and −6.0 volts. The triangular waveform from oscillator 240 is applied through a resistor 242 to the negative input terminal of an operational amplifier 244 (for example, device type LF347N).

Also, the output of amplifier 232 which corresponds to the integrated temperature deviation signal originating from the bath temperature sensor 140, is applied to the positive input terminal of amplifier 244 through resistor 246. A feedback resistor 248 is connected between the output terminal of amplifier 244 and the negative input terminal thereof, the output terminal of amplifier 244 also being coupled to the positive input terminal of comparator 228. The output of comparator 228 is coupled to a heater drive circuit 250 which operates to allow the heating element 108 to be energized when the output of comparator 228 is high, and cuts off energization of the heating element 108 when the output of comparator 228 is low.

Figure 8A:
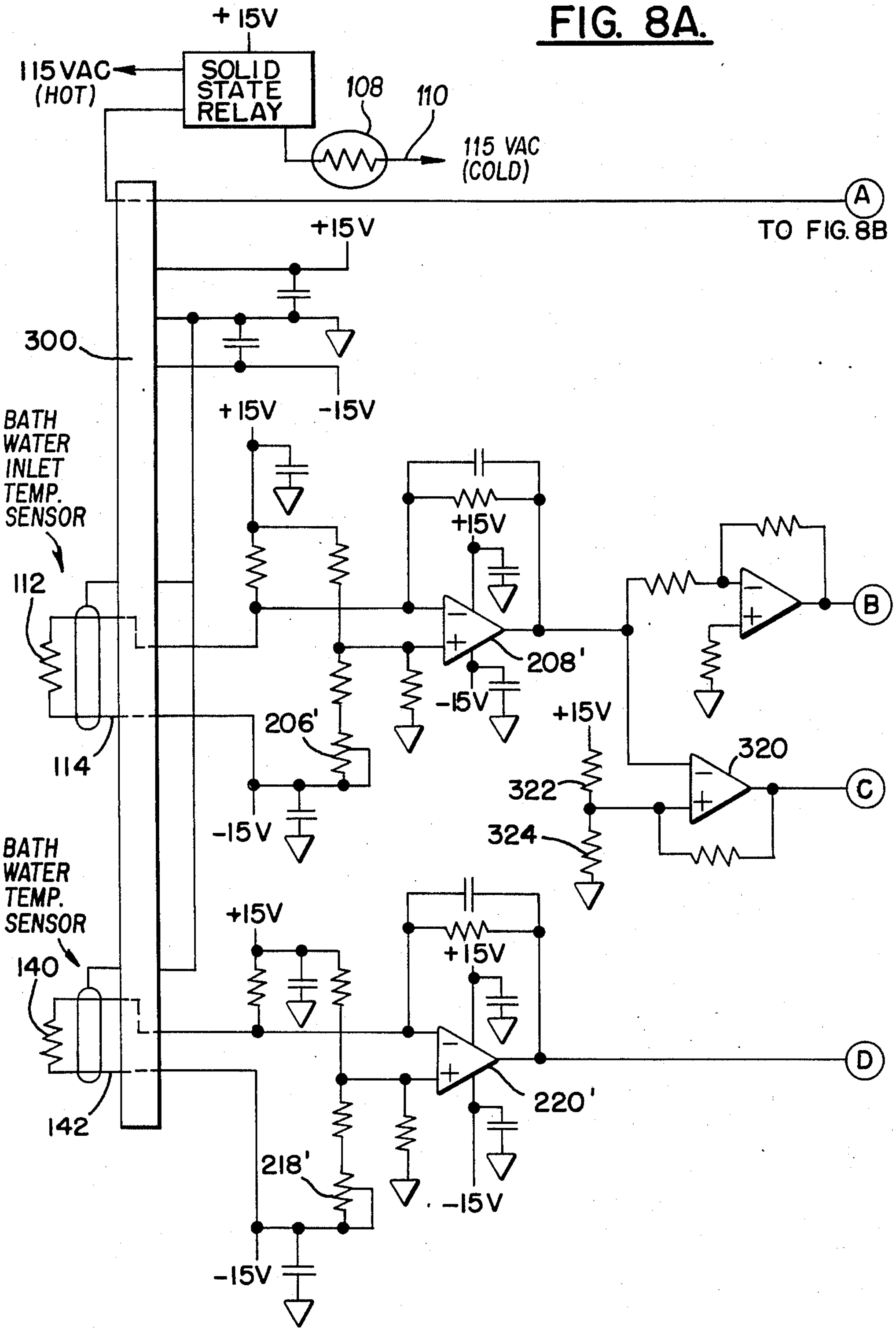
FIGS. 8A and 8B together form an electrical schematic diagram showing another form of the present temperature control system, as may be embodied on a printed circuit board.
Figure 8B:
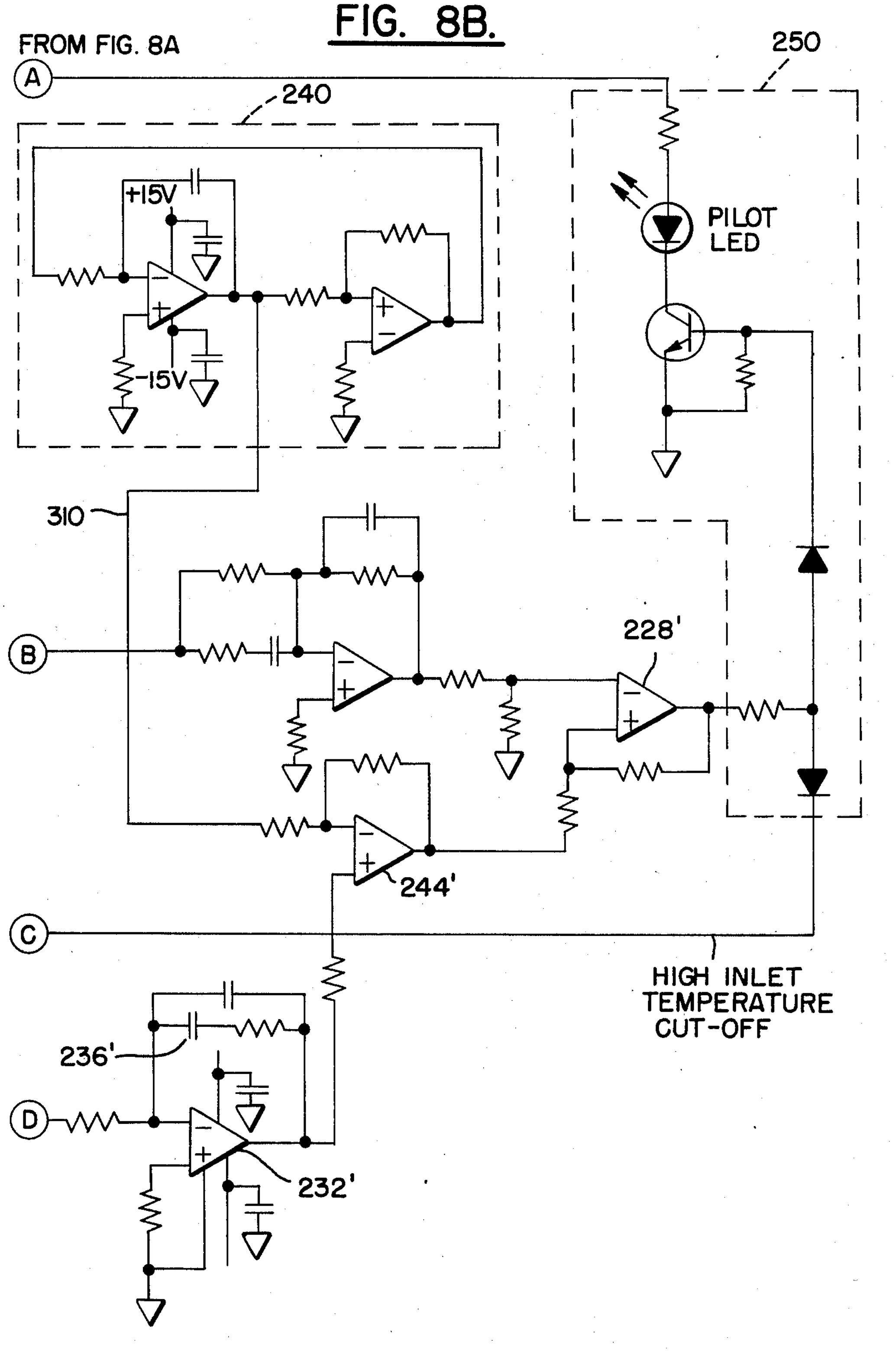

A more detailed form of the bath temperature control circuitry represented in FIG. 7, is set out FIGS. 8A and 8B.

In particular, the circuitry in FIGS. 8A and 8B is arranged to be embodied on a printed circuit board having a connector portion 300 (FIG. 8A). An input to the connector portion 300 includes one of the control leads of a solid state relay, e.g. Grayhill Model No. 7052-04-0-12-N. The other control lead from the solid state relay goes to +15 volts. One of the output (power) leads of the relay forms one of the leads 110 of the heating element 108. The other output (power) lead of the solid state relay connects to the hot side of a 115 volt 60 Hz power line, while the cold side of the power line is coupled to the other lead 110 of the heating element 108.

Also applied to the connector portion 300 is a balanced plus and minus 15 VDC supply voltage together with a supply ground, the leads 114 associated with the water inlet temperature sensor 112, and the leads 142 associated with the bath temperature sensor 140.

The triangular wave oscillator 240 appears in the upper left portion of FIG. 8B, and is formed by a pair of cascaded operational amplifiers connected in a feedback loop to produce a triangular waveform on lead 310. Both amplifiers forming the triangular wave oscillator 240 may be obtained on a single chip; for example, type LF 347N.

The oscillator 240 may be a standard circuit obtainable in many linear integrated circuit application books, for example: National Semiconductor's Linear Applications Handbook dated 1980, page AN31-6 and labeled "Function Generator". The present circuitry combines a 12 volt peak to peak saw-tooth voltage on lead 310 with the output of the integrating amplifier 232' (set point voltage) in amplifier 244' to provide a 1.2 volt saw-tooth signal superimposed on the d.c. set point voltage. This signal is then fed into the comparator 228'. Combining the signals in this manner serves to pulse-width modulate the heater current so that "full on" to "full off" of the heating element 108 corresponds to a 0.6° C. change in the replenishment fluid's temperature. The integrating amplifier 232' output (the set point) changes exactly enough so the the bath is held at the desired temperature.

The heater drive 250 is formed of a switching transistor (for example, type 2N 5232) the emitter of which is grounded, and the collector of which is connected in series through a pilot LED and a 470 ohm resistor to one of the solid state relay control leads at the connector portion 300. The heating element 108 thus is driven directly off of the power lines, which puts an upper limit on the saw-tooth wave oscillator frequency inasmuch as the heating element 108 is always on for at least a full half cycle of the power line frequency.

A high water inlet temperature cut-off signal is coupled to the heater drive 250 from the output of an amplifier 320. The negative input terminal of the amplifier 320 is connected to receive an output signal from amplifier 208' which output signal is representative of the deviation of the water inlet temperature detected by the inlet sensor 112 from a preset water inlet temperature. The positive input terminal of amplifier 320 is connected to a reference voltage obtained from a divider formed of resistors 322, 324. Accordingly, when the inlet temperature sensor detects a temperature of such magnitude that the heating element 108 may be damaged (i.e., a "dry" condition), the amplifier 320 produces a negative output signal of a level sufficient to cut off the switching transistor in the heater drive circuit 250. The use of the inlet temperature sensor 112 as an "over temperature" sensor so as to shut the heater assembly 102 down in case of "dry" operation, is a safety feature in addition to the provision of the thermostat switch 128 in the heating element 108, described above.

The temperature of the water bath 12 in the analyzer 10 thus can be heated and regulated to within plus or minus 0.1 degree C., in accordance with the following procedure.

The water bath plumbing system is first turned on to initiate a normal flow of water into and out from the tank portion 100. The temperature of the bath is then monitored with a reference temperature probe at a point near the bath sensor 140, the probe being supported out of contact with any metal parts or fiber-optic light pipes associated with the photometer of the analyzer 10. The temperature control circuitry is then activated and the pilot LED in the heater drive circuit 250 should be on continuously. The bath water temperature is then allowed to stabilize at 37 plus or minus 0.5 degree C.

Using a digital voltmeter, the output of amplifier 220' in FIG. 8A is monitored and the trimming resistor 218' is adjusted so that the output of amplifier 220' reads a negative six volts for each degree C. the water temperature is below 37.00 degree C.

In order to eliminate the time constant of the integrating amplifier stage including amplifier 232' in FIG. 8B, the integrating capacitor 236' is momentarily shorted for at least a second.

The bath 12 is left to stabilize for ten minutes and the output voltage of water inlet bridge amplifier 208' is measured and recorded. Power is then turned off, and the resistance across the trimming resistor 206' in FIG. 8 is measured and recorded. The resistance of trimming resistor 206' is then reset to equal the value previously measured for the trimming resistor 206', less 224 ohms multiplied by the recorded output voltage of the inlet bridge amplifier 208'. That is, 224 ohms is added to the value of trimming resistor 206' for every −1 volt previously recorded as the output voltage of the inlet bridge amplifier 208'.

Power is again turned on and, after another ten minutes stabilization time, the entire procedure can be repeated if necessary. If the foregoing procedure is carried out correctly, the temperature of the water bath 12 should converge on 37 degrees C. with the least iterations.

Using the temperature control system and method disclosed herein, it has been found that the temperature of the water bath 12 can be maintained at 37.00 (plus or minus 0.02) degree C. at the point of the bath temperature sensor 140. Further, a transient load of 330 watts, applied by heater strips placed on the outside of the bath tank portion 100, caused no change of the 37.00 (plus or minus 0.02) degree C. band. From cuvette tests and measurement data obtained with the present invention, plus or minus 0.1 degree C. can be held at each of the photometer stations SA1–SA8 under worst case conditions.

It will be appreciated that the present invention obtains control over a liquid bath, when the liquid bath is subjected to extraneous heat sources and/or sinks. The liquid in the bath tank is replenished with fluid whose heat content difference from the fluid in the tank just matches the heat transferred from the tank to such extraneous heat sources and/or sinks. That is, the temperature difference between the tank and the replenishment fluid (ΔT), times the mass flow rate (m/t), times the specific heat of the fluid (sp. Ht), equals the extraneous heat transfer rate (dQ/dt):

$$dQ/dt = (\Delta T)(m/t)(sp.\ Ht)$$

The replenishment fluid is then rapidly mixed with the fluid in the bath to provide uniform temperature throughout the bath.

The present system is implemented by providing means for detecting any deviation from the desired bath temperature, feeding such deviation into a high gain circuit which changes the set point (SP) of a secondary control circuit. The secondary control circuit then maintains the temperature of the replenishment fluid at the set point (SP).

The system of the invention in effect duplicates the use of a three-dimensional heater universally distributed throughout the bath, with each portion of the heater separately controlled to maintain its little-volume ($\Delta v$) at the desired temperature. The high circulation rate in the bath maintains uniform temperature throughout the bath, while the high gain system of the present configuration allows the correct amount of heat to be metered into the system.

If cooling is required, a precooler may be used to drop the temperature of the replenishment fluid to a point such that some heat is still applied. The control of the temperature of the replenishment fluid is both fast and accurate inasmuch as a temperature sensor is immediately downstream from the system heater. Using high flow velocity past the heater and replenishment fluid temperature sensor, and by placing them close together, minimizes the transport delay. This makes for a very tight temperature control of the replenishment fluid as the transport delay term is a limiting factor in any servo loop.

Integration of the bath temperature error signal is used to control the secondary loop's set point. This not only gives very tight temperature control because of the infinite gain, but also eliminates any error due to drift of the replenishment fluid temperature sensor. Pulse-width modulation and a solid state relay are used to provide an efficient control of the 60 Hz a.c. power to the heaters. Even faster system response could be obtained if the heater power was either d.c. or higher frequency a.c.

Thus, the present system accuracy depends only on the bath temperature sensor and the associated bridge resistors. Use of an integrating amplifier in conjunction with the bridge circuit limits all other errors to 2nd or 3rd order. This includes all voltages, including those across the bridge.

While the foregoing description and drawing repesent the preferred embodiments of the present invention, it will be obvious to those skilled in the art that various changes and modifications may be made therein without departing from the true spirit and scope of the present invention.

I claim:

1. A method of controlling the temperature of a liquid bath in a tank so that a desired constant liquid temperature is maintained substantially throughout said liquid bath, the bath liquid being subject to circulation into said tank at liquid inlet means on said tank and out of said tank at liquid outlet means on said tank, comprising the steps of:

setting the desired constant liquid temperature, providing an energizable heating element externally of said tank and proximate said liquid inlet means, and arranging the heating element in heat transfer relation with the liquid entering said tank at said liquid inlet means, measuring a first temperature of the entering liquid at a point downstream of the heating element upstream of the liquid inlet means, determining the degree of imbalance between the measured first temperature and a preset liquid inlet temperature, measuring a second temperature of the liquid at a point in the liquid bath in said tank remote from said liquid inlet means, determining the degree of imbalance between the measured second temperature and the set desired constant liquid temperature, producing deviation signals corresponding respectively to the degress of imbalance obtained in said two measuring steps, obtaining a heating element drive signal by comparing the deviation signals with one another, and energing the heating element in accordance with the heating element drive signal.

2. The method of claim 1 including providing a first heat sensor proximate to the heating element and deriving a first temperature signal corresponding to the temperature of the liquid in contact with the first heat sensor for carrying out the first temperature measuring step, and providing a second heat sensor at said remote point in said tank and deriving a second temperature signal corresponding to the temperature of the liquid in contact with the second heat sensor for carrying out the second temperature measuring step.

3. The method of claim 1 including applying a pulse-width modulated electric current to the heating element in carrying out said energizing step.

4. The method of claim 1 including moving objects through the liquid bath and thereby heating the objects to the desired constant liquid temperature.

5. The method of claim 4 including filling a series of containers each with a certain liquid and transporting the liquid-filled containers through the liquid bath.

6. A system for controlling the temperature of a liquid bath in a tank so that a desired constant liquid temperature is maintained substantially throughout said liquid bath, comprising:

a tank including liquid inlet means and liquid outlet means, means for circulating liquid into said tank through said inlet means and out of said tank through said outlet means;

energizable heating means external of said tank and proximate said liquid inlet means, for heating the liquid entering the tank, at the liquid inlet means, first sensor means upstream of said liquid inlet means and downstream of said heating means for detecting a first temperature of the liquid entering the tank, first circuit means coupled to said first sensor means for determining a degree of imbalance between the detected first temperature and a preset liquid inlet temperature and for producing a corresponding first deviation signal, second sensor means located at a point in the tank remote from the liquid inlet means for detecting a second temperature of the liquid at said remote point, second circuit means coupled to said second sensor means for determining a degree of imbalance between the detected second temperature and said desired constant liquid temperature, and for producing a corresponding second deviation signal, and bath temperature control means coupled to outputs of said first and said second circuit means, and to said heating means, for energizing said heating means in accordance with the levels of said first and said second deviation signal;

wherein said bath temperature control means includes means for comparing said first and said second deviation signals to generate a corresponding output signal, and means responsive to said output signal for controlling energization of said heating means.

7. A system according to claim 6 including means comprising pulse-width modulating circuitry for coupling the output signal from said comparing means to said heating means so that the energization of said heating means is pulse-width modulated in accordance with said output signal.

8. A system according to claim 6 wherein said control means includes means for integrating the signal produced by said second circuit means to provide a representative signal for comparison with the signal produced by said first circuit means, by said comparing means.

9. A system according to claim 6 comprising means communicating with said liquid inlet means and said liquid outlet means for forming a bath liquid circulation loop outside said tank.

10. A system according to claim 9 including pump means in said circulation loop for circulating the bath liquid from said liquid outlet means to said liquid inlet means at a given rate.

11. A system according to claim 8 including transport means associated with said tank for passing a series of liquid-filled containers through the liquid bath so that the temperatures of the liquid in the containers are each brought to the temperature of the liquid bath.

12. A system for controlling the temperature of a liquid bath in a tank so that a desired liquid temperature is maintained substantially throughout said liquid bath, comprising:

a tank for containing a liquid bath, liquid inlet means for directing a supply of liquid into the tank, liquid outlet means for directing an effluent of liquid from the tank, a heater assembly including a generally cylindrical hollow member arranged to conduct liquid to be heated toward the tank inlet means from outside the tank, a liquid inlet at one axial end of said hollow member and a liquid outlet at the opposite axial end of said hollow member, a heating element extending within said hollow member in the vicinity of said liquid inlet in heat transfer relation with liquid conducted through said hollow member, and a first temperature sensor extending within said hollow member in the vicinity of said liquid outlet for detecting the temperature of liquid conducted toward the tank inlet means by said hollow member, coupling means connected between the tank inlet means and said liquid outlet of said heat assembly, a second temperature sensor at a point in the tank remote from the tank inlet means for detecting the temperature of the bath liquid at said remote point, and bath temperature control means coupled to said first and said second temperature sensors, and to said heating element of said heater assembly, for energizing said heating element in accordance with the liquid temperatures detected by said first and said second temperature sensors, said control means including means for establishing a set liquid inlet temperature for detection by said first sensor, means for establishing a set constant liquid temperature for detection by said second sensor in the tank, means for producing deviation signals corresponding to deviations between each of the detected liquid temperatures and the corresponding set temperatures, means for comparing said deviation signals to generate a corresponding output signal, and means responsive to said output signal to control energization of said heating element.

13. A system according to claim 12, including circulating means coupled between the tank outlet and the liquid inlet of said heater assembly for forming a bath liquid circulation loop outside the tank.

14. A system according to claim 12, wherein said first temperature sensor comprises a thermistor probe in the form of a needle.

15. A system according to claim 14, wherein said thermistor probe has a time constant of about 0.2 seconds in water at 20 ft. per second.

16. A system according to claim 12, wherein said second temperature sensor comprises a thermistor probe in the form of a tubular member.

17. A system according to claim 16, wherein said thermistor probe has a time constant of about 2.0 seconds in water at 20 ft. per second.

18. A system according to claim 12, wherein said first and said second temperature sensors each comprise a thermistor probe, and the time constant of said first temperature sensor is relatively short.

19. A system according to claim 18, wherein the time constant of said second temperature sensor is about ten times that of said first temperature sensor.

20. A system according to claim 12, wherein said circulating means includes pump means for pumping recirculated path liquid into said liquid inlet of said heater assembly.

21. A system according to claim 20, wherein said circulation means forms a high volume loop and a low flow circulation loop, each of said loops having an outlet end in communication with said liquid inlet of said heater assembly.

22. A system according to claim 21, including a filter in said low flow circulation loop.

23. A system according to claim 22, wherein said pump means includes a pump in each of said loops, said pumps being constructed and arranged to allow a desired volume mix of recirculated bath liquid in the associated loops to be pumped into said liquid inlet of said heater assembly.

24. A system according to claim 22, wherein said bath temperature control means includes bridge circuits for producing temperature signals corresponding to the deviations of the temperatures detected by each of said first and said second temperature sensors from the set liquid temperatures.

25. A system according to claim 24, including means for integrating the temperature signal from a bridge circuit associated with said second temperature sensor.

26. A system according to claim 25, wherein said comparing means of said control means is arranged to compare an output of said integrating means with the temperature signal form a different bridge circuit associated with said first temperature sensor, to provide a signal operative to cause energization of said heating element.

27. An automated clinical analysis system of the kind in which a series of cuvettes are transported in the form of a belt through a heated water bath, so that liquid reaction mixtures in the cuvettes will be at a preset temperature on which computations by the systems are based, comprising:

a tank including liquid inlet means and liquid outlet means;

means for circulating liquid into said tank through said inlet means and out of said tank through said outlet means;

energizable heating means external of said tank and proximate said liquid inlet means for heating the liquid entering the tank at the liquid inlet means;

first sensor means upstream of said liquid inlet means and downstream of said heating means for detecting a first temperature of the liquid entering the tank;

first circuit means coupled to said first sensor means for determining a degree of imbalance between the detected first temperature and a preset liquid inlet temperature, and for producing a corresponding first deviation signal;

second sensor means located at a point in the tank remote from the liquid inlet means for detecting a second temperature of the liquid at said remote point;

second circuit means coupled to said second sensor means for determining a degree of imbalance between the detected second temperature and said desired constant liquid temperature, and for producing a corresponding second deviation signal;

bath temperature control means coupled to outputs of said first and said second circuit means, and to said heating means, for energizing said heating means in accordance with the levels of said first and said second deviation signals;

wherein said bath temperature control means includes means for comparing said first and said second deviation signals to produce an output signal and means responsive to said output signal for controlling energization of said heating means; and transport means associated with said tank for passing said series of cuvettes through the liquid bath so that the temperatures of the liquid in the cuvettes are each brought to the temperature of the liquid bath.

28. An analysis system according to claim 27, including means comprising pulse-width modulating circuitry for coupling the output signal from said comparing means to said heating means so that the energization of said heating means is pulse-width modulated in accordance with said output signal.

29. An analysis system according to claim 27, wherein said control means includes means for integrating the signal produced by said second circuit means to provide a representative signal for comparison with the signal produced by said first circuit means, by said comparing means.

30. An analysis system according to claim 27, including means communicating with said liquid inlet means and said liquid outlet means for forming a bath liquid circulation loop outside said tank.

31. An analysis system according to claim 30, including pump means in said circulation loop for circulating the bath liquid from said liquid outlet means to said liquid inlet means at a given rate.

* * * * *